United States Patent
Kang et al.

(10) Patent No.: US 11,252,728 B2
(45) Date of Patent: Feb. 15, 2022

(54) RECEIVER SUPPORTING CARRIER AGGREGATION AND WIRELESS COMMUNICATION APPARATUS INCLUDING THE RECEIVER

(71) Applicant: SAMSUNG ELECTRONICS CO., LTD., Suwon-si (KR)

(72) Inventors: Byoungjoong Kang, Incheon (KR); Heeseon Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 16/915,443

(22) Filed: Jun. 29, 2020

(65) Prior Publication Data

US 2021/0120553 A1 Apr. 22, 2021

(30) Foreign Application Priority Data

Oct. 18, 2019 (KR) .................. 10-2019-0130186

(51) Int. Cl.
*H04B 7/0413* (2017.01)
*H04W 72/04* (2009.01)

(52) U.S. Cl.
CPC ...... *H04W 72/0453* (2013.01); *H04B 7/0413* (2013.01)

(58) Field of Classification Search
CPC . H04B 1/005; H04B 7/0413; H04W 72/0453; H04L 5/001
See application file for complete search history.

(56) References Cited

U.S. PATENT DOCUMENTS

| | | |
|---|---|---|
| 9,014,648 B2 | 4/2015 | Gudem et al. |
| 9,185,705 B2 | 11/2015 | Rajagopal et al. |
| 9,473,336 B2 | 10/2016 | Pan et al. |
| 9,525,503 B2 | 12/2016 | Narathong et al. |
| 9,755,767 B2 | 9/2017 | Dayal et al. |

(Continued)

OTHER PUBLICATIONS

Tang, C-C, et al., "An LTE-A Multimode Multiband RF Transceiver with 4RX/2TX Inter-Band Carrier Aggregation, 2-Carrier 4x4 MIMO with 256QAM and HPUE Capability in 28nm CMOS", 2019 IEEE International Solid-State Circuits Conference, Feb. 20, 2019, Session 21/4G/5G Transceivers/21.4, Digest of Technical Papers, pp. 350-352.

(Continued)

*Primary Examiner* — Rahel Guarino
(74) *Attorney, Agent, or Firm* — Sughrue Mion, PLLC

(57) ABSTRACT

A receiver including a plurality of primary antennas configured to receive a plurality of first carrier signals corresponding to at least a first frequency band; a plurality of diversity antennas configured to receive a plurality of second carrier signals corresponding to at least a second frequency band; a first local oscillator configured to generate a first oscillation signal; a first load circuit pair connected to the first local oscillator, and configured to frequency down-convert at least one of the plurality of first carrier signals, and having a first load circuit and a second load circuit adjacent to the first load circuit; and a second load circuit pair connected to the first local oscillator, configured to frequency down-convert at least one of the plurality of second carrier signals, and having a third load circuit and a fourth load circuit adjacent to the third load circuit.

20 Claims, 15 Drawing Sheets

(56) References Cited

U.S. PATENT DOCUMENTS

| | | |
|---|---|---|
| 10,164,666 B2 | 12/2018 | Khlat et al. |
| 2013/0316670 A1* | 11/2013 | Tasic .................. H04L 27/2647 455/234.1 |
| 2018/0159563 A1 | 6/2018 | Khlat et al. |
| 2018/0302127 A1 | 10/2018 | Kahrizi et al. |

OTHER PUBLICATIONS

Mikhemar, M., et al., "A Rel-12 2G/3G/LTE-Advanced 3CC Cellular Receiver", IEEE Journal of Solid-State Circuits, vol. 51, No. 5, May 2016, pp. 1066-1079.

* cited by examiner

RECEIVER SUPPORTING CARRIER AGGREGATION AND WIRELESS COMMUNICATION APPARATUS INCLUDING THE RECEIVER

CROSS-REFERENCE TO THE RELATED APPLICATION

This application is based on and claims priority under 35 U.S.C. § 119 to Korean Patent Application No. 10-2019-0130186, filed on Oct. 18, 2019, in the Korean Intellectual Property Office, the disclosure of which is incorporated by reference herein in its entirety.

BACKGROUND

1. Field

The present disclosure relates to wireless communication, and more particularly, to a receiver supporting carrier aggregation and a wireless communication apparatus including the same.

2. Description of Related Art

Carrier aggregation may include a technique of using a plurality of carriers together for signal transmission and reception of one wireless communication apparatus. A frequency range transmitted by one carrier may be referred to as a frequency channel, and a data amount transmitted through a wireless channel may increase by carrier aggregation supporting a plurality of frequency channels. Recently, the development of communication technology causes a variety of frequency regions of carriers used for carrier aggregation, and to cover this, a wireless communication apparatus may include a plurality of local oscillators configured to provide oscillation signals having various frequencies at once. When the number of local oscillators increases, the arrangement and design thereof are complicated, and signal line lengths from certain local oscillators to load circuits requiring the same oscillation signal are significantly different, and thus, a signal interval occurs, thereby causing deterioration in the performance of the wireless communication apparatus.

SUMMARY

Provided is a connection structure between load circuits and local oscillators for efficiently supporting wide carrier aggregation and improving the performance of a wireless communication apparatus, a switching structure for routing carrier signals to the load circuits, and a method of appropriately allocating the carrier signals to the load circuits.

According to an embodiment, a receiver includes a plurality of primary antennas configured to receive a plurality of first carrier signals corresponding to at least a first frequency band of a plurality of frequency bands; a plurality of diversity antennas configured to receive a plurality of second carrier signals corresponding to at least a second frequency band of the plurality of frequency bands; a first local oscillator configured to generate a first oscillation signal; a first load circuit pair connected to the first local oscillator, and configured to frequency down-convert at least one first carrier signal of the plurality of first carrier signals, and having a first load circuit and a second load circuit adjacent to the first load circuit; and a second load circuit pair connected to the first local oscillator, configured to frequency down-convert at least one second carrier signal of the plurality of second carrier signals, and having a third load circuit and a fourth load circuit adjacent to the third load circuit.

According to an embodiment, a wireless communication apparatus includes a plurality of primary antennas configured to receive a plurality of first carrier signals corresponding to at least a first frequency band of a plurality of frequency bands; a plurality of diversity antennas configured to receive a plurality of second carrier signals corresponding to at least a second frequency band of the plurality of frequency bands; a first reception circuit connected to the plurality of primary antennas and configured to generate a plurality of first baseband signals from the plurality of first carrier signals; and a second reception circuit connected to the plurality of diversity antennas and configured to generate a plurality of second baseband signals from the plurality of second carrier signals, wherein each reception circuit of the first reception circuit and the second reception circuit includes a plurality of load circuit pairs, and wherein each load circuit of the plurality of load circuit pairs includes a carrier aggregation load circuit connected to a first local oscillator, and an auxiliary load circuit adjacent to the carrier aggregation load circuit and connected to the first local oscillator.

According to an embodiment, a wireless communication apparatus includes a first reception circuit having a plurality of first load circuit pairs configured to receive a plurality of first carrier signals corresponding to at least a first frequency band of a plurality of frequency bands through a plurality of primary antennas, and configured to perform frequency down-conversion using the first frequency band; a second reception circuit having a plurality of second load circuit pairs configured to receive a plurality of second carrier signals corresponding to at least a second frequency band of the plurality of frequency bands through a plurality of diversity antennas, and configured to perform the frequency down-conversion using the second frequency band; and a baseband processor configured to control routing of the plurality of first carrier signals to the plurality of first load circuit pairs, and routing of the plurality of second carrier signals to the plurality of second load circuit pairs, based on a pre-set usage of a load circuit, wherein each load circuit pair of the plurality of first load circuit pairs and the plurality of second load circuit pairs includes a carrier aggregation load circuit connected to a first local oscillator, and an auxiliary load circuit adjacent to the carrier aggregation load circuit and connected to the first local oscillator.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
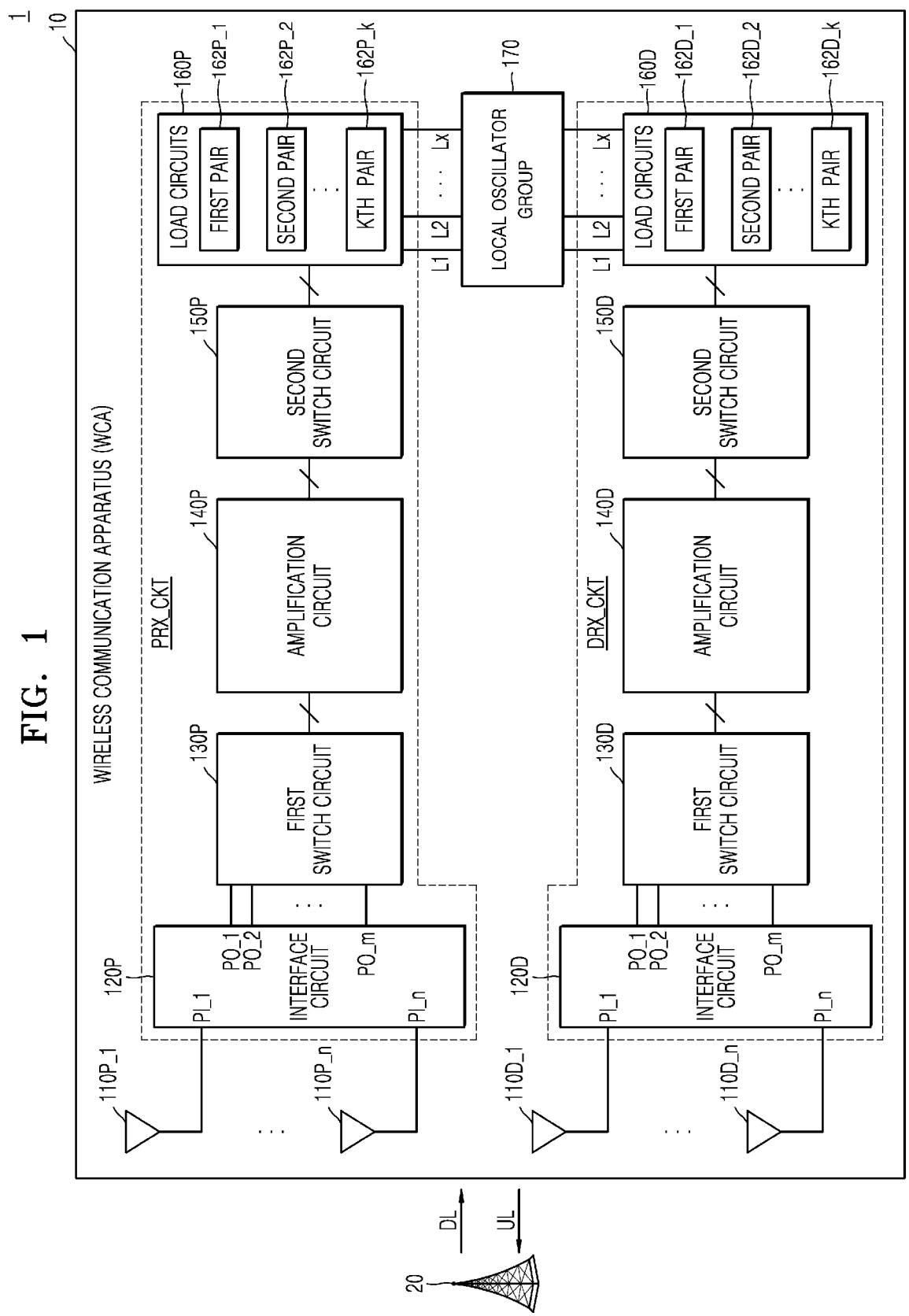
FIG. 1 is a block diagram of an example of a wireless communication system including a wireless communication apparatus and a base station, according to an embodiment.

FIG. 1 is a block diagram of an example of a wireless communication system 1 including a wireless communication apparatus 10 and a base station 20, according to an example embodiment.

Referring to FIG. 1, the wireless communication apparatus 10 and the base station 20 may communicate through a downlink (DL) and an uplink (UL). For example, the wireless communication system 1 may be a long term evolution (LTE) system, a code division multiple access (CDMA) system, a global system for mobile communications (GSM) system, a wireless local area network (WLAN) system, or another wireless communication system. The wireless communication apparatus 10 may indicate various devices capable of being stationary or mobile and communicating with the base station 20 to transmit and receive data and/or control information. For example, the wireless communication apparatus 10 may be referred to as a user equipment, a terminal equipment, a mobile station (MS), a mobile terminal (MT), a user terminal (UT), a subscriber station (SS), a wireless device, a handheld device, or the like. The base station 20 may generally indicate a stationary station communicating with a wireless communication apparatus and/or another base station and exchange data and/or control information by communicating with a wireless communication apparatus and/or another base station. For example, the base station 20 may be referred to as a Node B, an evolved-Node B (eNB), a base transceiver system (BTS), an access point (AP), or the like.

A wireless communication network between the wireless communication apparatus 10 and the base station 20 may share available network resources to support communication of a plurality of users. For example, the wireless communication network may deliver information therethrough by various schemes such as CDMA, frequency division multiple access (FDMA), time division multiple access (TDMA), orthogonal frequency division multiple access (OFDMA), and single carrier frequency division multiple access (SC-FDMA).

The wireless communication system 1 may support carrier aggregation (CA) using a plurality of carriers. That is, the wireless communication apparatus 10 and the base station 20 may simultaneously use a plurality of carriers to transmit and receive data. Carriers used by the wireless communication apparatus 10 and the base station 20 in CA may be referred to as component carriers, and a frequency range transmitted by one component carrier may be referred to as a frequency channel. A frequency channel may be included in a frequency band, and a frequency band may include a plurality of contiguous frequency channels. As described below with reference to FIGS. 2A to 2C, frequency channels used by the wireless communication apparatus 10 and the base station 20 in CA may be various. Hereinafter, a signal received through a certain carrier may be referred to as a carrier signal.

The wireless communication apparatus 10, or the base station 20, may include a structure for appropriately processing carrier signals received through various frequency channels. According to an embodiment, as shown in FIG. 1, the wireless communication apparatus 10 may include first to $n^{th}$ plurality of primary antennas 110P_1 to 110P_n, first to $n^{th}$ diversity antennas 110D_1 to 1100_n, which may be referred to as secondary antennas, a first reception circuit PRX_CKT, which may be referred to as a primary reception circuit, a second reception circuit DRX_CKT, which may be referred to as a diversity reception circuit, and a local oscillator group 170. According to some embodiments, the first reception circuit PRX_CKT and the second reception circuit DRX_CKT may be implemented by one radio frequency integrated chip (RFIC). The first reception circuit PRX_CKT and the second reception circuit DRX_CKT may perform not only an operation of receiving a signal but also an operation of transmitting a signal and may be respectively referred to as a first transceiver circuit and a second transceiver circuit.

The first reception circuit PRX_CKT may include an interface circuit 120P, a first switch circuit 130P, an amplification circuit 140P, a second switch circuit 150P, and load circuits 160P and may be connected to the plurality of primary antennas 110P_1 to 110P_n. The interface circuit 120P may include a plurality of switch elements and a plurality of duplexers for receiving a first RF signal through a plurality of input ports PI_1 to PI_n connected to the primary antennas 110P_1 to 110P_n, respectively. The interface circuit 120P may further include frequency filters for outputting a plurality of first carrier signals distinguished for each frequency band or frequency channel by filtering the first RF signal received through the first to $n^{th}$ primary antennas 110P_1 to 110P_n. The interface circuit 120P may output the first carrier signals through a plurality of output ports PO_1 to PO_m. The number of input ports PI_1 to PI_n may be the same as or different from the number of output ports PO_1 to PO_m. In addition, the interface circuit 120P may further include matching circuits for performing impedance matching between the switch elements/duplexers and the amplification circuit 140.

The first switch circuit 130P may include a plurality of switch elements for connecting the interface circuit 120P to the amplification circuit 140. The amplification circuit 140 may perform low noise amplification on the first carrier signals received from the first switch circuit 130P, and to this end, the amplification circuit 140 may include a plurality of low noise amplifiers (LNAs). The amplification circuit 140 may output the amplified first carrier signals to the second switch circuit 150P. The second switch circuit 150P may include a plurality of switch elements for connecting the amplification circuit 140 to the load circuits 160P.

The load circuits 160P may perform a demodulation operation on the received first carrier signals to generate first baseband signals from the first carrier signals and output the first baseband signals. For example, the load circuits 160P may include a plurality of load circuits each including a certain transformer, a mixer, and a baseband filter, such that frequency down-conversion on the first carrier signals is performed. The load circuits 160P may be arranged as pairs of two load circuits to design optimal signal lines with a plurality of local oscillators in the local oscillator group 170. However, according to some embodiments, at least one of the load circuits 160P may be arranged without forming a pair, and it will be sufficiently understood that the disclosure is not limited to the structure shown in FIG. 1.

According to an embodiment, the load circuits 160P may include a plurality of load circuit pairs, e.g., first to $k^{th}$ load circuit pairs 162P_1 to 162P_k, and first to $k^{th}$ load circuit pairs 162P_1 to 162P_k may include a CA load circuit and an auxiliary load circuit arranged to be adjacent to each other and connected to a same local oscillator. The CA load circuit may be referred to as a load circuit configured to demodulate, or for example, frequency low-convert, a carrier signal for CA-based communication. The auxiliary load circuit may be referred to as a load circuit configured to demodulate, or for example, frequency low-convert, a carrier signal for receive diversity/multiple input and multiple output-based communication. However, according to some embodiments, the auxiliary load circuit may be configured to demodulate a carrier signal for CA-based communication.

According to an embodiment, each of a CA load circuit and an auxiliary load circuit in a single load circuit, for example the first load circuit pair 162P_1, may receive an oscillation signal from a local oscillator commonly connected thereto, and perform a frequency down-conversion operation. In detail, the CA load circuit may frequency down-convert a carrier signal for CA-based communication, and the auxiliary load circuit may frequency down-convert a carrier signal for receive diversity/multiple input and multiple output-based communication. Herein, the carrier signal to be frequency down-convened by the auxiliary load circuit may be located in the same or similar frequency band or frequency channel as that of the carrier signal to be frequency down-converted by the CA load circuit.

According to an embodiment, an auxiliary load circuit in a single load circuit, for example the first load circuit pair 162P_1, may be additionally connected to a local oscillator connected to an adjacent load circuit, for example the second load circuit pair 162P_2. Accordingly, the auxiliary load circuit may receive a carrier signal located in a frequency band or frequency channel different from that of a carrier signal received by a CA load circuit forming a pair with the auxiliary load circuit, and perform frequency down-conversion.

According to an embodiment, an auxiliary load circuit in a single load circuit, for example the first load circuit pair 162P_1, may be additionally connected to a local oscillator which is not connected to other load circuits, for example the second to $k^{th}$ load circuit pairs 162P_2 to 162P_k. Accordingly, the auxiliary load circuit may frequency down-convert a carrier signal for CA-based communication, located in a frequency band or frequency channel different from that of a carrier signal received by a CA load circuit forming a pair with the auxiliary load circuit.

Detailed embodiments of examples of the first to kth load circuit pairs 162P_1 to 162P_k will be described below with reference to FIGS. 5 to 9.

The first and second switch circuits 130P and 150P may be implemented such that first carrier signals are appropriately routed to the load circuit pairs 162P_1 to 162P_k, respectively. A baseband processor in the wireless communication apparatus 10 may generate a switching control signal based on control information received from the base station 20 and provide the switching control signal to the first and second switch circuits 130P and 150P. The control information may include at least one of information about CA, which may be for example information about CA-based communication, and information about receive diversity/multiple input and multiple output. In detail, the base station 20 may pre-set carriers to be used for signal transmission, and the baseband processor may generate a switching control signal by acquiring in advance control information including information about scheduling of the pre-set carriers from the base station 20. The first and second switch circuits 130P and 150P may route first carrier signals to the load circuit pairs 162P_1 to 162P_k based on the switching control signal. According to an embodiment, the baseband processor may preferably allocate a carrier signal for CA-based communication to any one of CA load circuits in the plurality of load circuit pairs 162P_1 to 162P_k and allocate a carrier signal for receive diversity/multiple input and multiple output-based communication to an auxiliary load circuit forming a pair with a CA load circuit which processes a carrier signal located in the same or similar frequency band or frequency channel as that of a frequency band or frequency channel of the carrier signal for receive diversity/multiple input and multiple output-based communication. A detailed operation of an example of the baseband processor will be described below with reference to FIGS. 10 and 11.

The local oscillator group 170 may include a plurality of local oscillators. The plurality of local oscillators may be connected to the load circuits 160P through a plurality of signal lines L1 to Lx. A detailed configuration of examples of the local oscillators will be described below with reference to FIGS. 5 to 9. Frequencies of oscillation signals respectively generated by the plurality of local oscillators may be controlled by the baseband processor.

The second reception circuit DRX_CKT may include an interface circuit 120D, a first switch circuit 130D, an amplification circuit 140D, a second switch circuit 150D, and load circuits 160D and may be connected to the plurality of diversity antennas 110D_1 to 110D_n. An embodiment of a configuration of the first reception circuit PRX_CKT may be applied to a configuration of the second reception circuit DRX_CKT, and thus, a detailed description thereof is omitted herein. However, according to some embodiments, the idea may be applied to the first reception circuit PRX_CKT and the second reception circuit DRX_CKT, and implementation examples of the first reception circuit PRX_CKT and the second reception circuit DRX_CKT may differ from each other.

According to an embodiment, a connection structure of the wireless communication apparatus 10 with the local oscillator group 170 may be relatively simply designed through a structure of the first to fourth load circuit pairs 162P_1 to 162P_k and 162D_1 to 162D_k each having a CA load circuit and an auxiliary load circuit arranged to be adjacent to each other and connected to a same local oscillator, and through this design, a difference, according to a signal line length difference, between oscillation signals to be used for a frequency down-conversion operation of the CA load circuit and the auxiliary load circuit may be reduced to a certain threshold or less, thereby improving the performance of the wireless communication apparatus 10. The threshold corresponds to a signal line length difference value causing an oscillation signal difference which does not influence the performance of the wireless communication apparatus 10 and may be determined through a plurality of tests, machine learning, or the like. In addition, the threshold may be changed according to a communication scheme, a communication environment, and the like of the wireless communication apparatus 10.

Figure 2A:
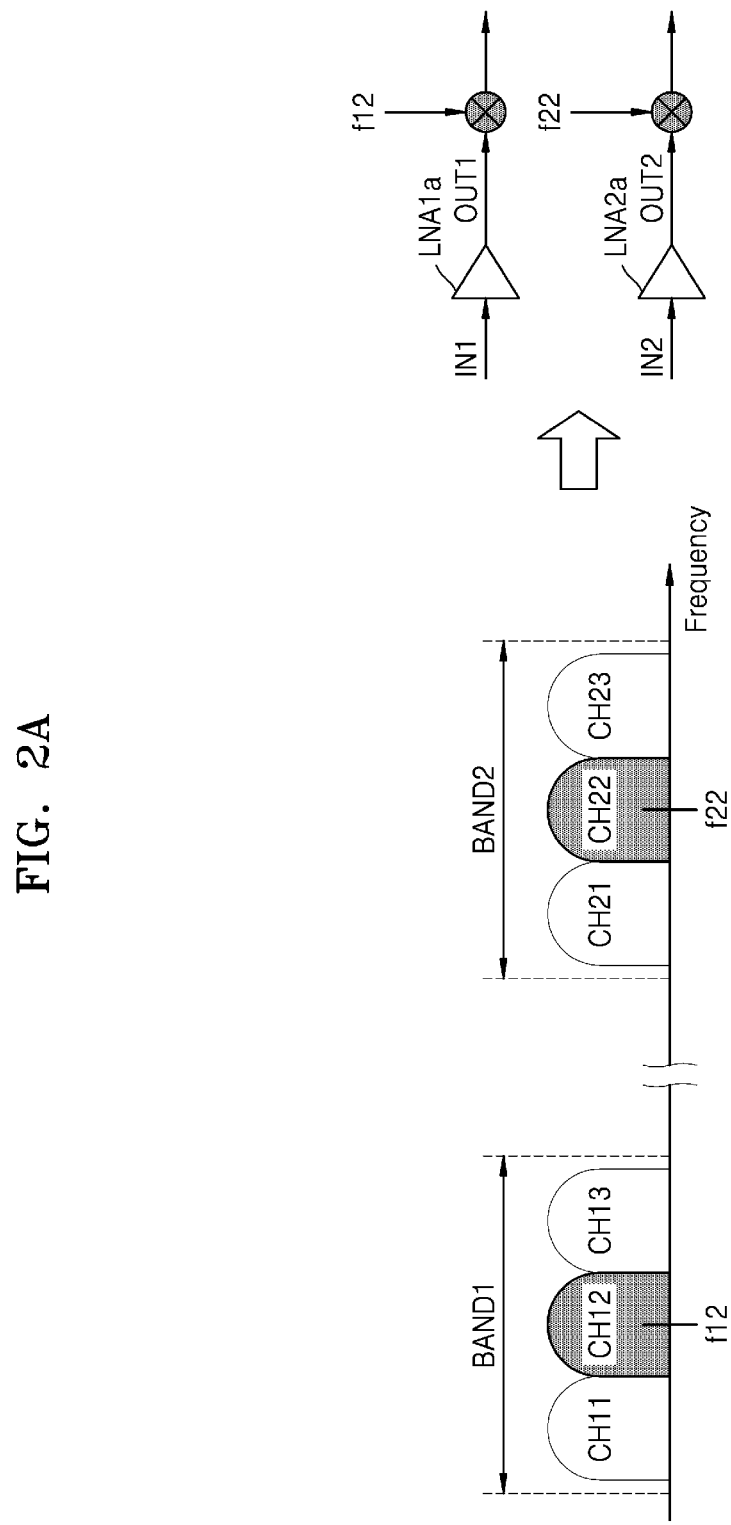
FIGS. 2A to 2C illustrate examples of types of carrier aggregation and structures of a reception circuit for extracting a carrier signal from frequency channels corresponding to the types of carrier aggregation according to embodiments.
Figure 2B:
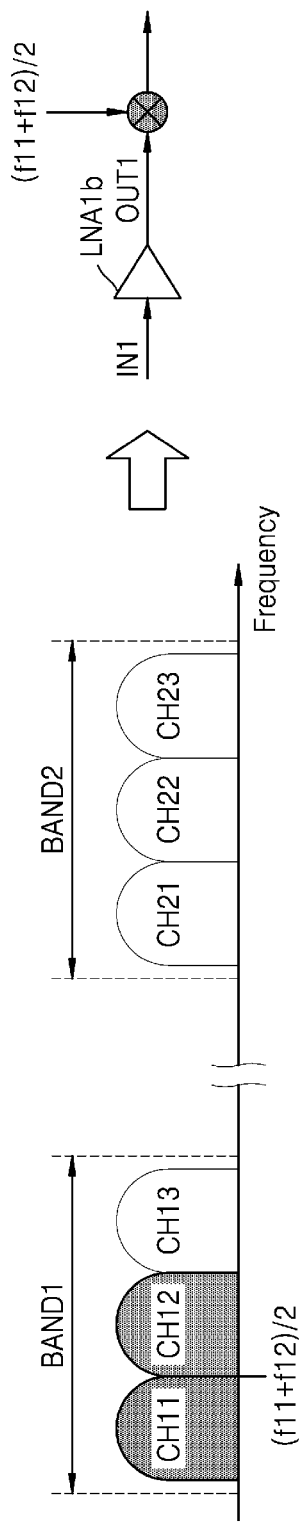
Figure 2C:
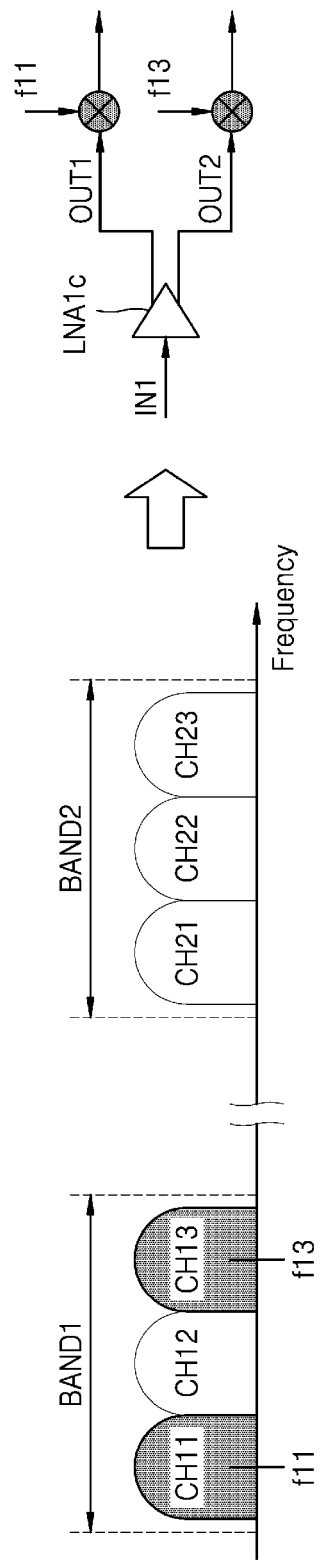

FIGS. 2A to 2C illustrate examples of types of CA and structures of a reception circuit for extracting a carrier signal from frequency channels corresponding to the types of CA. In detail, FIG. 2A illustrates an example of inter-band CA, FIG. 2B illustrates an example of contiguous intra-band CA, and FIG. 2C illustrates an example of non-contiguous intra-band CA. In the examples of FIGS. 2A to 2C, it is assumed that two frequency bands, for example first and second frequency bands BAND1 and BAND2, may be used for data transmission, wherein one frequency band may have three frequency channels, or three carriers. However, FIGS. 2A to 2C are merely examples, and thus, the disclosure is not limited thereto, and one frequency band may have a greater number of frequency channels.

Referring to FIG. 2A, in the inter-band CA, frequency channels being used may be arranged in different frequency bands, respectively. For example, as shown in FIG. 2A, frequency channels CH12 and CH22 being used may be respectively included in the first and second frequency bands BAND1 and BAND2, and accordingly, the frequency channels CH12 and CH22 being used may be spaced to be relatively far from each other. Two LNAs, for example LNA1*a* and LNA2*a*, may output first and second output signals OUT1 and OUT2, which may be referred to as first and second amplified carrier signals, by amplifying first and second carrier signals IN1 and IN2, respectively, and the first and second output signals OUT1 and OUT2 may be converted into baseband signals through frequency down-conversion using frequencies f12 and f22 respectively corresponding to the frequency channels CH12 and CH22.

Referring to FIG. 2B, in the contiguous intra-band CA, frequency channels being used may be contiguously arranged in a same frequency band. For example, as shown in FIG. 2B, frequency channels CH11 and CH12 being used may be included in the first frequency band BAND1 and may be adjacent to each other. An LNA, for example LNA1*b*, may output the first output signal OUT1 by amplifying the first carrier signal IN1, and the first output signal OUT1 may be frequency down-converted using an intermediate frequency, for example (f11+f12)/2, of frequencies f11 and f12 of carriers respectively corresponding to the frequency channels CH11 and CH12.

Referring to FIG. 2C, in the non-contiguous intra-band CA, frequency channels being used may be non-contiguously, or separately, arranged in a same frequency band. For example, as shown in FIG. 2C, frequency channels CH11 and CH13 being used may be included in the first frequency band BAND1 and may be separated from each other. As one example for separating the frequency channels CH1 and CH13 being used in the non-contiguous intra-band CA, as shown in FIG. 2C, an LNA, for example LNA1*c*, may output two output signals, for example the first and second output signals OUT1 and OUT2, from the first carrier signal IN1, and the first and second output signals OUT1 and OUT2 may be frequency down-converted using frequencies f1 and f13 respectively corresponding to the frequency channels CH11 and CH13.

Figure 3:
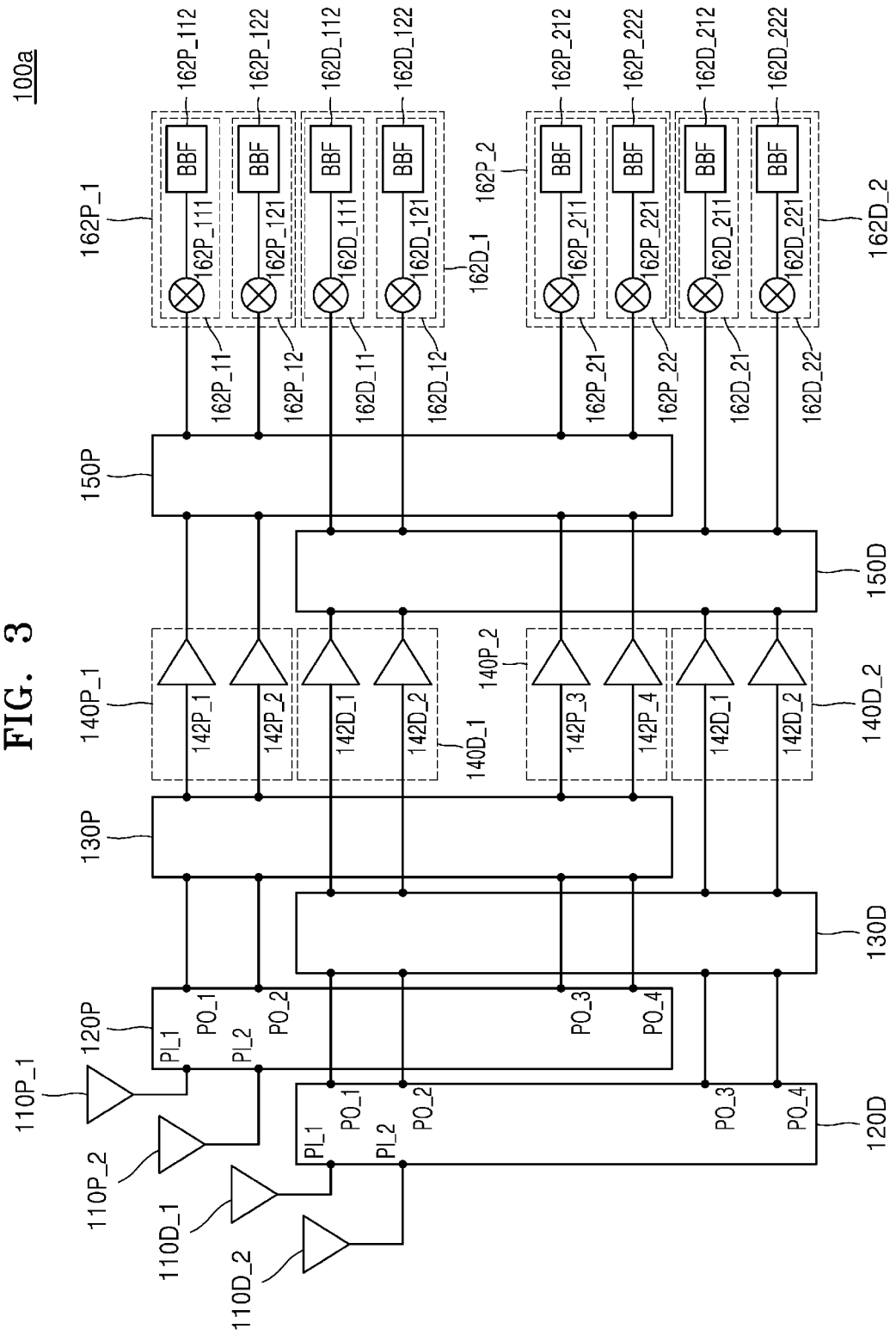
FIG. 3 is a block diagram of an example of a receiver of a wireless communication apparatus, according to an embodiment.

FIG. 3 is a block diagram of an example of a receiver 100*a* of a wireless communication apparatus, according to an example embodiment.

Referring to FIG. 3, the receiver 100*a* may include a first primary antenna 110P_1, a second primary antenna 110P_2, a first interface circuit 120P, a first switch circuit 130P, a first amplification circuit 140P_1, a second amplification circuit 140P_2, a second switch circuit 150P a first load circuit pair 162P_1, a second load circuit pair 162P_2, a first diversity antenna 11D_1, a second diversity antenna 110D_2, a second interface circuit 120D, a third switch circuit 130D, a third amplification circuit 140D_1, a fourth amplification circuit 140D_2, a fourth switch circuit 150D, a third load circuit pair 162D_1, and a fourth load circuit pair 162D_2.

The first to fourth amplification circuits 140P_1, 140P_2, 140D_1, and 140D_2 may include two LNAs 142P_1, 142P_2, 142P_3, 142P_4, 142D_1, 142D_2, 142D_3, and 142D_4, respectively. However, the first to fourth amplification circuits 140P_1, 140P_2, 140D_1, and 140D)_2 are merely an example and are not limited thereto but may include a greater number of LNAs. In addition, the first to fourth load circuit pairs 162P_1, 162P_2, 162D_1, and 162D_2 may be arranged to be adjacent to each other and respectively include two load circuits 162P_11, 162P_12, 162P_21, 162P_22, 162D_11, 162D_12, 162D_21, and 162D_22 commonly connected to a single local oscillator. The load circuits 162P_11, 162P_12, 162P_21, 162P_22, 162D_11, 162D_12, 162D_21, and 162D_22 may respectively include mixers 162P_111, 162P_121, 162P_211, 162P_221, 162D_111, 162D_121, 162D_211, and 162D_221 and baseband filters 162P_112, 162P_122, 162P_212, 162P_222, 162D_112, 162D_122, 162D_212, and 162D_222 for converting a high-frequency carrier signal into a baseband signal.

The first interface circuit 120P, the first and second switch circuits 130P and 150P, the first and second amplification circuits 140P_1 and 140P_2, and the first and second load circuit pairs 162P_I and 162P_2 may be included in a first reception circuit for receiving first carrier signals from the first and second primary antennas 110P_1 and 110P_2 and generating first baseband signals.

The second interface circuit 120), the third and fourth switch circuits 130D and 150D, the third and fourth amplification circuits 140D_1 and 140D_2, and the third and fourth load circuit pairs 162D_1 and 162D_2 may be included in a second reception circuit for receiving second carrier signals from the first and second diversity antennas 110D_1 and 110D_2 and generating second baseband signals.

First, a structure of the first reception circuit is described. The first and second primary antennas 110P_1 and 110P_2 may be connected to the first interface circuit 120P through first and second input ports PI_1 and PI_2, respectively. The first interface circuit 120P may filter RF signals received through the first and second primary antennas 110P_1 and 110P_2 and output at least one first carrier signal distinguished for each frequency band or frequency channel to the first switch circuit 130P through at least one of first to fourth output ports PO_1 to PO_4. The first switch circuit 130P may route the received at least one first carrier signal to the first and second amplification circuits 140P_1 and 140P_2. Each of the first and second amplification circuits 140P_1 and 140P_2 may amplify the received first carrier signal and output the amplified first carrier signal to the second switch circuit 150P. The second switch circuit 150P may route at least one amplified first carrier signal to the first and second load circuit pairs 162P_1 and 162P_2. The first and second load circuit pairs 162P_1 and 162P_2 may generate at least one first baseband signal by frequency down-converting the received at least one amplified first carrier signal and output the at least one first baseband signal to a baseband processor.

According to an embodiment, a first load circuit 162P_11 of the first load circuit pair 162P_1 may be a CA load circuit, a second load circuit 162P_12 thereof may be an auxiliary load circuit, a third load circuit 162P_21 of the second load circuit pair 162P_2 may be a CA load circuit, a fourth load circuit 162P_22 thereof may be an auxiliary load circuit. According to an embodiment, a CA load circuit and an auxiliary load circuit may be alternately arranged in one direction. For example, the usage of each load circuit may be pre-set according to a current communication environment, a communication scheme, and the like of a wireless communication apparatus, and the baseband processor may allocate carrier signals to load circuit pairs by considering the usage of load circuits included in each of load circuit pairs. For example, when a carrier signal output through the first interface circuit 120P is for CA-based communication, the baseband processor may control the first and second switch circuits 130P and 150P to route the carrier signal to the first load circuit 162P_11 of the first load circuit pair 162P_1 or the third load circuit 162P_21 of the second load circuit pair 162P_2. When the first load circuit 162P_11 receives the carrier signal, the first load circuit 162P_11 may frequency down-convert the carrier signal by using an oscillation signal having a frequency corresponding to the carrier signal. In addition, when a different carrier signal output through the first interface circuit 120P is for receive diversity/multiple input and multiple output-based communication and is located in the same or similar frequency band or frequency channel as that of the carrier signal, the baseband processor may control the first and second switch circuits 130P and 150P to route the different carrier signal to the second load circuit 162P_12 forming a pair with the first load circuit 162P_11. The second load circuit 162P_12 may frequency down-convert the different carrier signal by using the same oscillation signal as received by the first load circuit 162P_11. By doing this, because respective signal lines to a local oscillator to which the first load circuit 162P_11 and the second load circuit 162P_12 are commonly connected may be uniformly formed, a difference between oscillation signals respectively provided to the first load circuit 162P_11 and the second load circuit 162P_12 may be minimized.

A configuration of the second reception circuit for receiving an RF signal by being connected to the first and second diversity antennas 110D_1 and 110D_2 may be the same as the configuration of the first reception circuit, and thus, a detailed description thereof is omitted herein.

Figure 4:
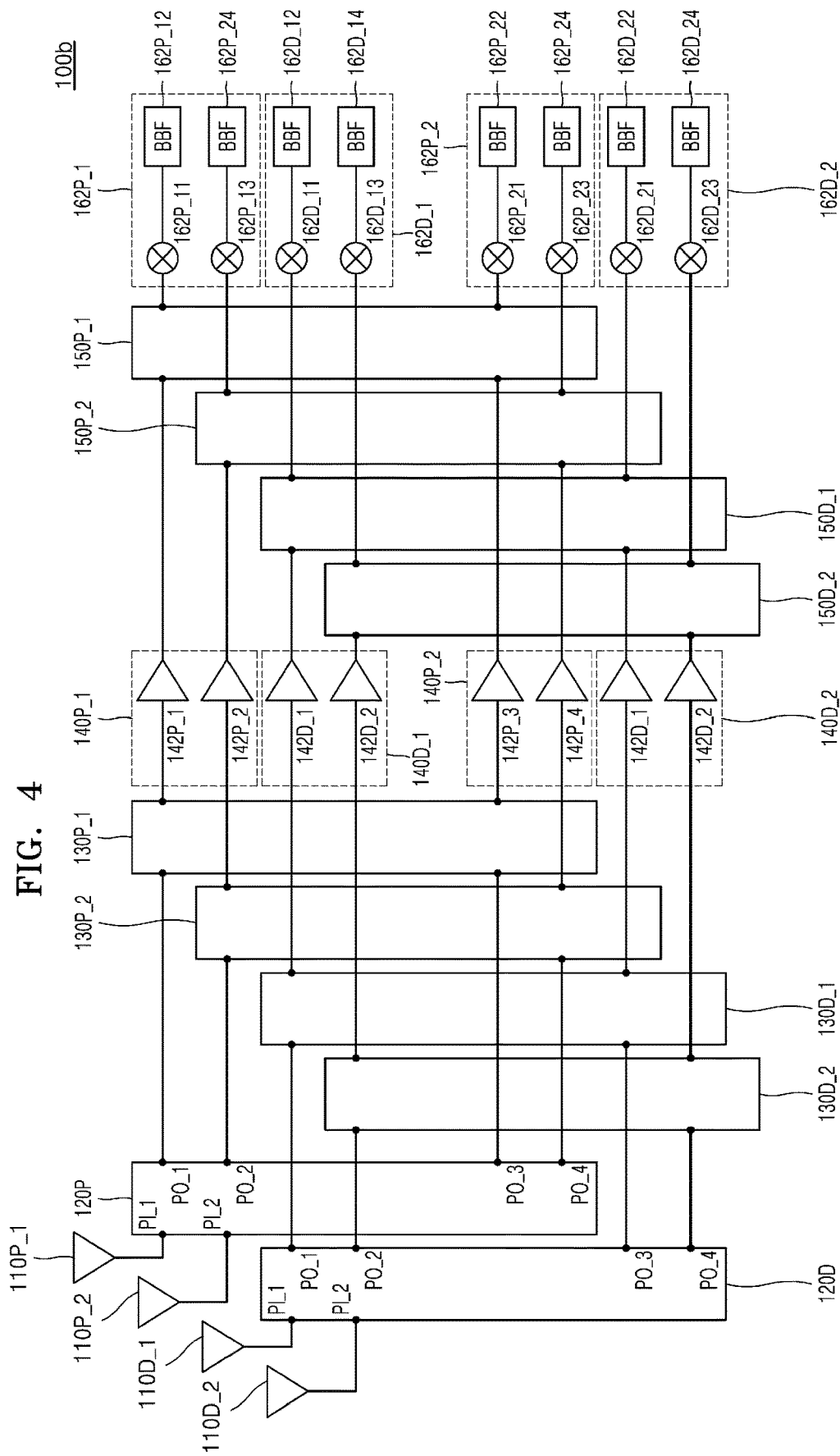
FIG. 4 is a block diagram of an example of a receiver of a wireless communication apparatus, according to an embodiment.

FIG. 4 is a block diagram of an example of a receiver 100*b* of a wireless communication apparatus, according to an embodiment. A difference from the receiver 100*a* of FIG. 3 is mainly described with reference to FIG. 4.

Referring to FIG. 4, the receiver 100*b* may include the first primary antenna 110P_1, the second primary antenna 110P_2, the first interface circuit 120P, a first-1 switch circuit 130P_1, a first-2 switch circuit 130P_2, the first amplification circuit 140P_1, the second amplification circuit 140P_2, a second-1 switch circuit 150P_1, a second-2 switch circuit 150P_2, the first load circuit pair 162P_1, the second load circuit pair 162P_2, the first diversity antenna 110D_1, the second diversity antenna 110D_2, a third-1 switch circuit 130D_1, a third-2 switch circuit 130D_2, the third amplification circuit 140D_1, the fourth amplification circuit 140D_2, a fourth-1 switch circuit 150D_1, a fourth-2 switch circuit 150D_2, the third load circuit pair 162D_1, and the fourth load circuit pair 162D_2.

That is, the first to fourth switch circuits 130P, 150P, 130D, and 150D of FIG. 3 may be respectively divided into two switch circuits 130P_1, 130P_2, 150P_1, 1501_2, 130D_1, 130D_2, 150D_1, and 150D_2.

The baseband processor may control a plurality of switch circuits 130P_1, 130P_2, 150P_1, 150P_2, 130D_1, 130D_2, 150D_1, and 150D_2 to route carrier signals output from the first and second interface circuits 120P and 120D to the first to fourth load circuit pairs 162P_1, 162P_2, 162D_1, and 162D_2 according to embodiments.

However, the structures of the receivers 100*a* and 100*b* shown in FIGS. 3 and 4 are merely examples, and thus, the disclosure is not limited thereto, and the receivers 100*a* and 100*b* may be connected to a less or greater number of primary antennas and diversity antennas, include a less or greater number of load circuit pairs, and include a switching structure for appropriately routing carrier signals to the load circuit pairs.

Figure 5:
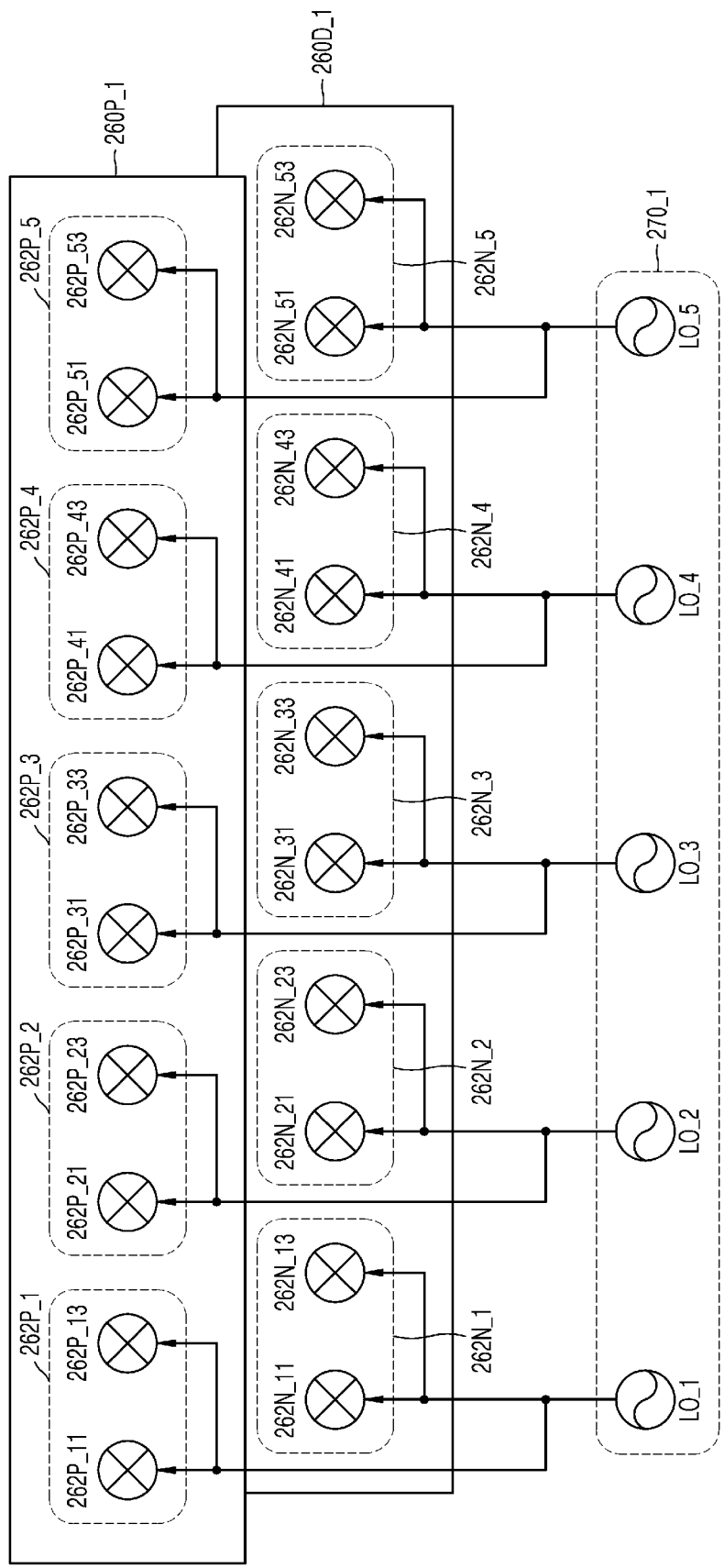
FIG. 5 is a block diagram of an example of first and second load circuits and a local oscillator group according to an embodiment.

FIG. 5 is a block diagram of examples of first and second load circuits 260P_1 and 260D_1 and a local oscillator group 270_1 according to an embodiment. In embodiments, the first load circuits 260P_1 may be included in the first reception circuit PRX_CKT of FIG. 1, and the second load circuits 260D_1 may be included in the second reception circuit DRX_CKT of FIG. 1.

Referring to FIG. 5, the first load circuits 260P_1 may include first to fifth load circuit pairs 262P_1 to 262P_5. The first to fifth load circuit pairs 262P_1 to 262P_5 may include two mixers 262P_11, 262P_13, 2621_21, 262P_23, 262P_31, 262P_33, 262P_41, 262P_43, 262P_51, and 262P_53, respectively. For example, some mixers 262P_11, 262P_21, 262P_31, 262P_41, and 262P_51, which may be for example CA mixers, included in the first to fifth load circuit pairs 262P_1 to 262P_5 may be used for frequency down-conversion of a carrier signal for CA-based communication, and the other mixers 2621P_13, 262P_23, 262P_33, 262P_43, and 262P_53, which may be referred to as auxiliary mixers, may be used for frequency down-conversion of a carrier signal for receive diversity/multiple input and multiple output-based communication.

The second load circuits 260D_1 may include sixth to tenth load circuit pairs 262N_1 to 262N_5. The sixth to tenth load circuit pairs 262N_1 to 262N_5 may include two mixers 262N_11, 262N_13, 262N_21, 262N_23.262N_31, 262N_33, 262N_41, 262N_43, 262N_51, and 262N_53, respectively. For example, some mixers 262N_11, 262N_21, 262N_31, 262N_41, and 262N_51 included in the sixth to tenth load circuit pairs 262N_1 to 262N_5 may be used for frequency down-conversion of a carrier signal for CA-based communication, and the other mixers 262N_13, 262N_23, 262N_33, 262N_43, and 262N_53 may be used for frequency down-conversion of a carrier signal for receive diversity/multiple input and multiple output-based communication.

The local oscillator group 270_1 may include first to fifth local oscillators LO_1 to LO_5. The first local oscillator LO_1 may be connected to the first and sixth load circuit pairs 262P_1 and 262N_1, the second local oscillator LO_2 may be connected to the second and seventh load circuit pairs 262P_2 and 262N_2, the third local oscillator LO_3 may be connected to the third and eighth load circuit pairs 262P_3 and 262N_3, the fourth local oscillator LO_4 may be connected to the fourth and ninth load circuit pairs 262P_4 and 262N_4, and the fifth local oscillator LO_5 may be connected to the fifth and tenth load circuit pairs 262P_5 and 262N_5. The first to fifth local oscillators LO_1 to LO_5 may generate oscillation signals having the same or different frequencies, respectively, and frequencies of the oscillation signals may be controlled by a baseband processor.

According to an embodiment, the baseband processor may allocate carrier signals to respective mixers by considering a connection structure between the first and second load circuits 260P_1 and 260D_1 and the local oscillator group 270_1 and the usage of the mixers and control switch circuits for example the first to fourth switch circuits 130P, 150P, 130D and 150D of FIG. 1, such that the carrier signals allocated to the mixers are appropriately routed.

According to an embodiment, the first and sixth load circuit pairs 262P_1 and 262N_1 may be arranged as closely as possible to the first local oscillator LO_1 to reduce a routing length to the first local oscillator LO_1, thereby reducing a design area and power consumption of the first local oscillator LO_1. Likewise, the second and seventh load circuit pairs 262P_2 and 262N_2 may be arranged as closely as possible to the second local oscillator LO_2, the third and eighth load circuit pairs 262P_3 and 262N_3 may be arranged as closely as possible to the third local oscillator LO_3, the fourth and ninth load circuit pairs 262P_4 and 262N_4 may be arranged as closely as possible to the fourth local oscillator LO_4, and the fifth and tenth load circuit pairs 262P_S and 262N_5 may be arranged as closely as possible to the fifth local oscillator LO_5.

In addition, a difference between signal lines from respective mixers 262P_11 and 262P_13 of the first load circuit pair 262P_1 to the first local oscillator LO_1 may be limited to be a certain threshold or less. This embodiment may be applied to all of the second to tenth load circuit pairs 262P_2 to 262P_5 and 262N_1 to 262N_5.

A receiver including the first and second load circuits 60P_1 and 260D_1 and the local oscillator group 270_1 of FIG. 5 may support communication using five carriers.

Figure 6:
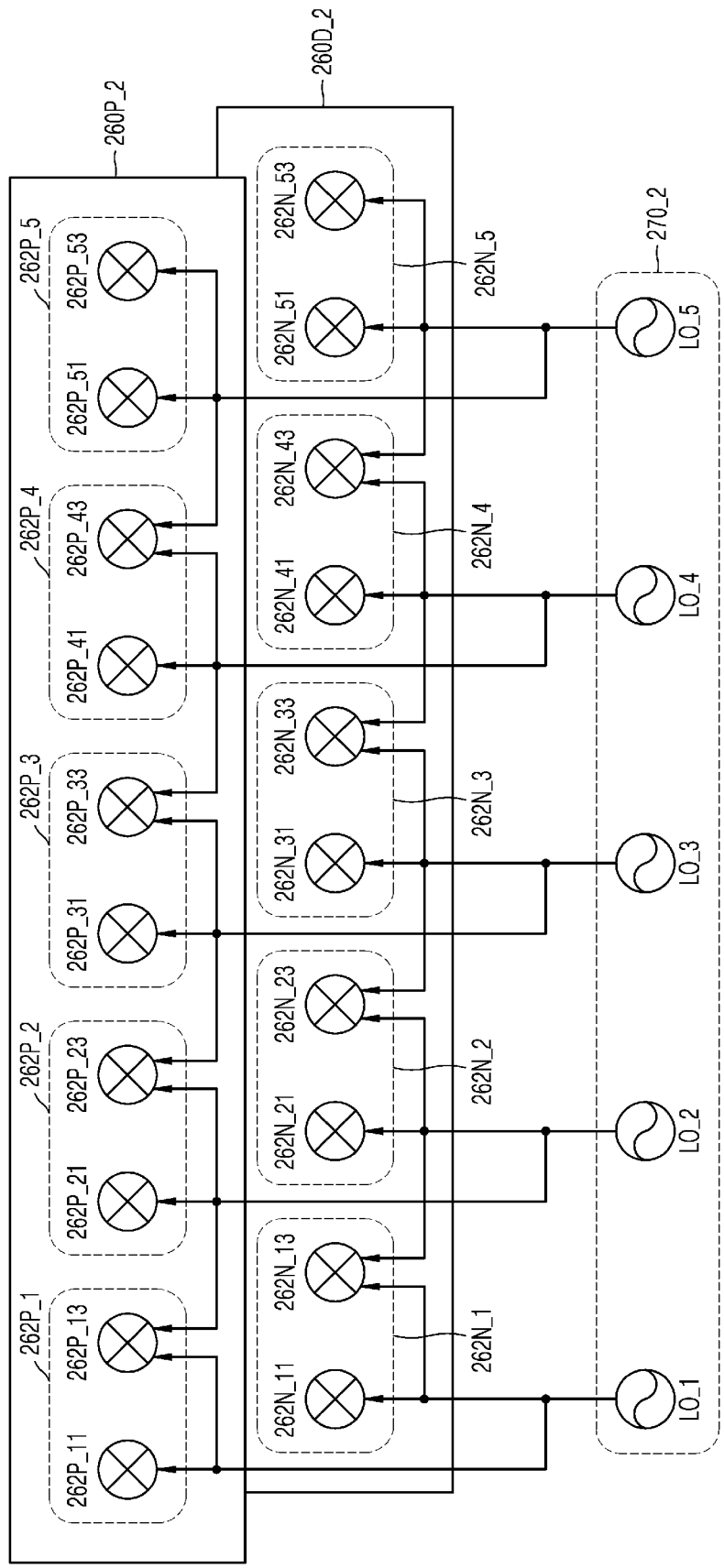
FIG. 6 is a block diagram of an example of first and second load circuits and a local oscillator group according to an embodiment.

FIG. 6 is a block diagram of an example of first and second load circuits 260P_2 and 260D_2 and a local oscillator group 270_2 according to an embodiment. Hereinafter, a difference from the first and second load circuits 260P_1 and 260D_1 of FIG. 5 will be mainly described with reference to FIG. 6.

Referring to FIG. 6, each of the auxiliary mixers 262P_13, 262P_23, 262P_33, 262P_43, 262N_13, 262N_23, 262N_33, and 262N_43 may be further connected to a local oscillator connected to another load circuit pair arranged to be adjacent thereto. For example, the auxiliary mixer 262P_13 of the first load circuit pair 262P_1 may be further connected to the second local oscillator LO_2 connected to the second load circuit pair 262P_2 arranged to be adjacent thereto. In this case, the auxiliary mixer 262P_13 of the first load circuit pair 262P_1 may frequency down-convert a carrier signal located in a frequency band or frequency channel different from that of a carrier signal allocated to the CA mixer 262P_11 forming a pair with the auxiliary mixer 262P_13, by using an oscillation signal from the second local oscillator LO_2.

However, this is merely an example, and the disclosure is not limited thereto, and for a carrier signal for receive diversity/multiple input and multiple output-based communication, only some of auxiliary mixers 262P_13, 262P_23, 262P_33, 262P_43, 262N_13, 262N_23, 262N_33, and 262N_43 may be further connected to local oscillators connected to different load circuit pairs arranged to be adjacent thereto, respectively.

Figure 7:
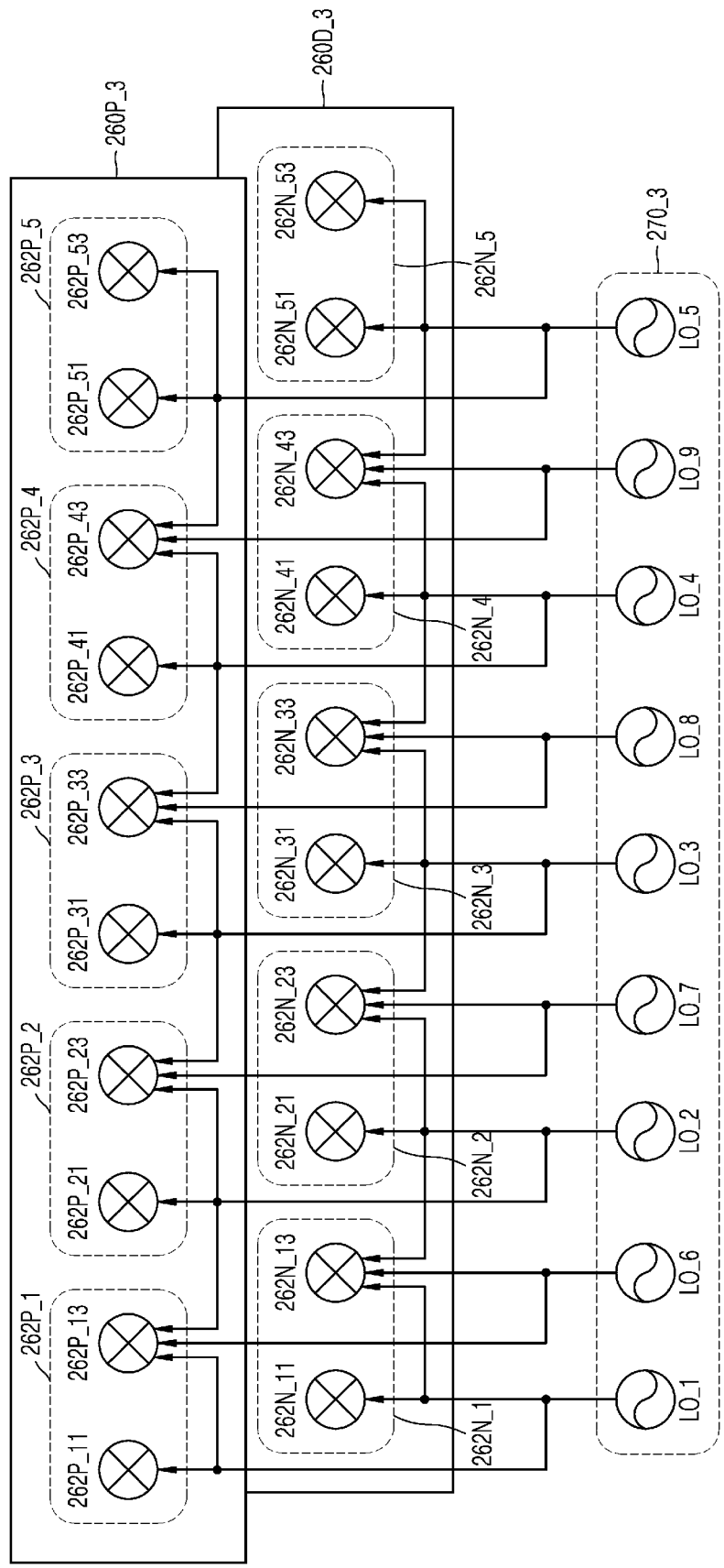
FIG. 7 is a block diagram of an example of first and second load circuits and a local oscillator group according to an embodiment.

FIG. 7 is a block diagram of examples of first and second load circuits 260P_3 and 260D_3 and a local oscillator group 270_3 according to an embodiment. Hereinafter, a difference from the first and second load circuits 260P_2 and 260D_2 of FIG. 6 will be mainly described with reference to FIG. 7.

Referring to FIG. 7, the local oscillator group 2703 may further include sixth to ninth local oscillators LO_6 to LO_9, and the auxiliary mixers 262P_3, 262P_23, 262P_33, 262P_43, 262N_13, 262N_23, 262N_33, and 262N_43 may be further connected to the sixth to ninth local oscillators LO_6 to LO_9, respectively. For example, the auxiliary mixer 262P_13 of the first load circuit pair 262P_1 may be further connected to the sixth local oscillator LO_6. The sixth local oscillator LO_6 is not connected to the other mixers 262P_11, 262P_21, 262P_23, 262P_31, 262P_33, 262P_41, 262P_43, 262P_51, and 262P_53 included in the first reception circuit except for the auxiliary mixer 262P_13, and the auxiliary mixer 262P_13 may frequency down-convert a carrier signal for CA-based communication by using an oscillation signal from the sixth local oscillator LO_6. That is, the auxiliary mixer 262P_13 may be used to not only receive diversity/multiple input and multiple output-based communication but also CA-based communication. In this case, the auxiliary mixer 262P_13 of the first load circuit pair 262P_1 may frequency down-convert a carrier signal located in a frequency band or frequency channel different from that of a carrier signal allocated to the CA mixer 262P_11 forming a pair with the auxiliary mixer 262P_13, by using an oscillation signal from the sixth local oscillator LO_6.

Other auxiliary mixers 262P_23, 262P_33, 262P_43, 262N_13, 262N_23, 262N_33, and 262N_43 may also be further connected to the sixth to ninth local oscillators LO_6 to LO_9, respectively, to frequency down-convert a carrier signal for CA-based communication.

However, this is merely an example, and the disclosure is not limited thereto, and only some of auxiliary mixers 262P_13, 262P_23, 262P_33, 262P_43, 262N_13, 262N_23, 262N_33, and 262N_43 may be further connected to local oscillators which are not connected to different load circuit pairs, respectively. An example embodiment thereof will be described with reference to FIG. 8.

A receiver including the first and second load circuits 260P_3 and 260D_3 and the local oscillator group 270_3 of FIG. 7 may support communication using ten carriers.

Figure 8:
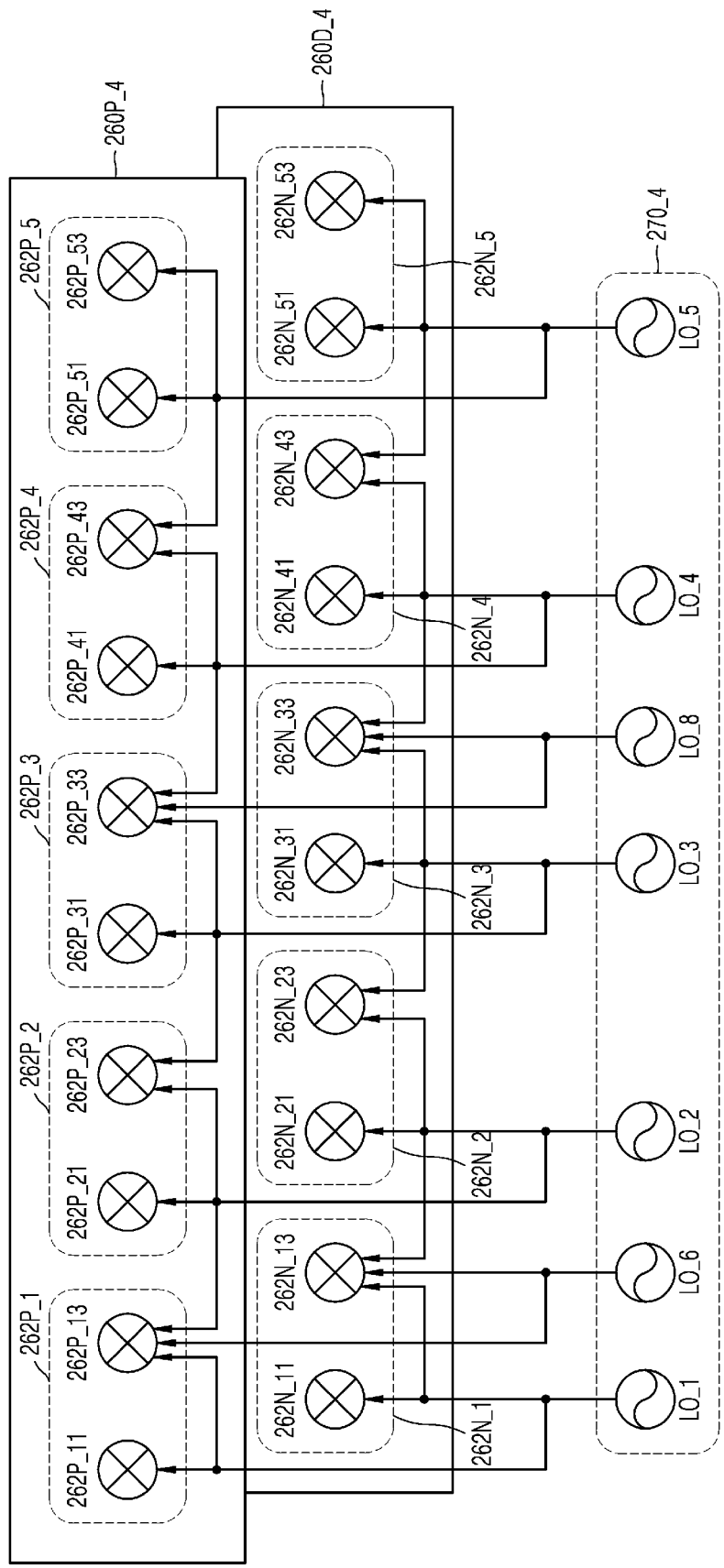
FIG. 8 is a block diagram of an example of first and second load circuits and a local oscillator group according to an embodiment.

FIG. 8 is a block diagram of first and second load circuits 260P_4 and 260D_4 and a local oscillator group 270_4 according to an embodiment. Hereinafter, a difference from the first and second load circuits 260P_3 and 260D_3 of FIG. 7 will be mainly described with reference to FIG. 8.

Referring to FIG. 8, the local oscillator group 270_4 may further include only the sixth local oscillator group LO_6, and some auxiliary mixers 262P_13 and 262N_13 among auxiliary mixers 262P_13, 262P_23, 262P_33, 262P_43, 262N_13, 262N_23, 262N_33, and 262N_43 may be further connected to the sixth local oscillator LO_6. Accordingly, only the some auxiliary mixers 262P_13 and 262N_13 may be used for not only receive diversity/multiple input and multiple output-based communication but also CA-based communication. The remaining auxiliary mixers 262P_23, 262P_33, 262P_43, 262N_23, 262N_33, and 262N_43 may be used only for receive diversity/multiple input and multiple output-based communication.

A receiver including the first and second load circuits 260P_4 and 260D_4 and the local oscillator group 270_4 of FIG. 8 may support communication using six carriers.

Figure 9:
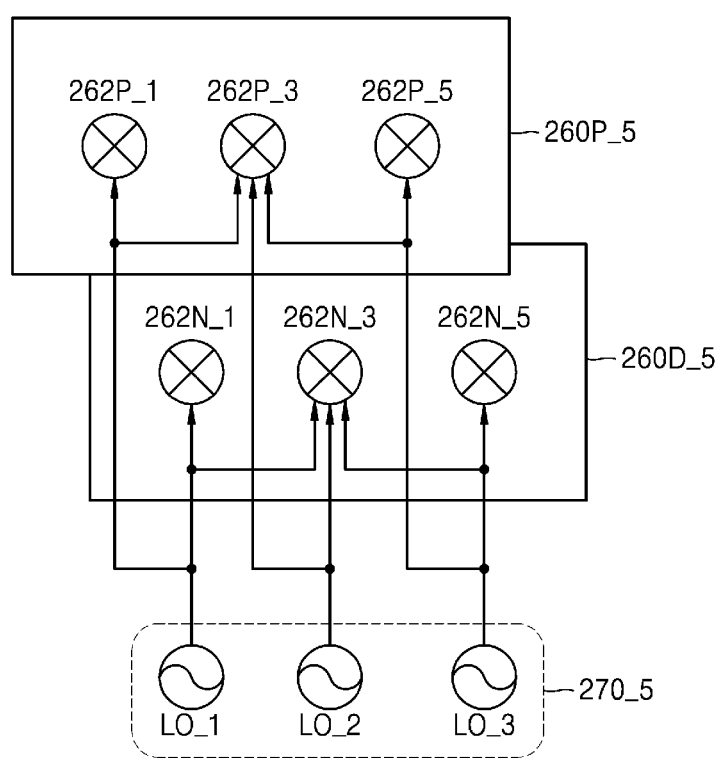
FIG. 9 is a block diagram of an example of first and second load circuits and a local oscillator group according to an embodiment.

FIG. 9 is a block diagram of examples of first and second load circuits 260P_5 and 260D_5 and a local oscillator group 270_5 according to an embodiment.

Referring to FIG. 9, the first load circuit 260_P 5 may include first to third mixers 262P_1, 262P_3, and 262P_5, the second load circuit 260D_5 may include fourth to sixth mixers 262N_1, 262N_3, and 262N_5, and the local oscillator group 270_5 may include first to third local oscillators LO_1, LO_2, and LO_3.

Each of the first and fourth mixers 262P_1 and 262N_1 may be connected to the first local oscillator LO_1, each of the third and sixth mixers 262P_5 and 262N_5 may be connected to the third local oscillator LO_3, and each of the second and fifth mixers 262P_3 and 262N_3 may be connected to the first to third local oscillators LO_1, LO_2, and LO_3. The second and fifth mixers 262P_3 and 262N_3 may be auxiliary mixers, and the other mixers 262P_1, 262P_5, 262N_1, and 262N_5 may be CA mixers.

The second mixer 262P_3 may form a pair with the first mixer 262P_1 to frequency down-convert a carrier signal for receive diversity/multiple input and multiple output-based communication by using the first local oscillator LO_1 or form a pair with the third mixer 262P_5 to frequency down-convert the carrier signal for receive diversity/multiple input and multiple output-based communication by using the third local oscillator LO_3. Furthermore, the second mixer 262P_3 may down-convert a carrier signal for receive diversity/multiple input and multiple output-based communication by using the second local oscillator LO_2, separately from the first mixer 262P_1 or the third mixer 262P_5. The embodiment of the second mixer 262P_3 may also be applied to the fifth mixer 262N_3, and a detailed description thereof is omitted herein.

A receiver including the first and second load circuits 260P_5 and 260D_5 and the local oscillator group 2705 of FIG. 9 may support communication using three carriers.

However, the embodiments of the first and second load circuits 260P_1 to 260P_5 and 260D_1 to 260D_5 and the local oscillator groups 270_1 to 270_5 described with reference to FIGS. 5 to 9 are intended to illustratively show embodiments, and thus, it will be sufficiently understood that the disclosure is not limited thereto.

Figure 10:
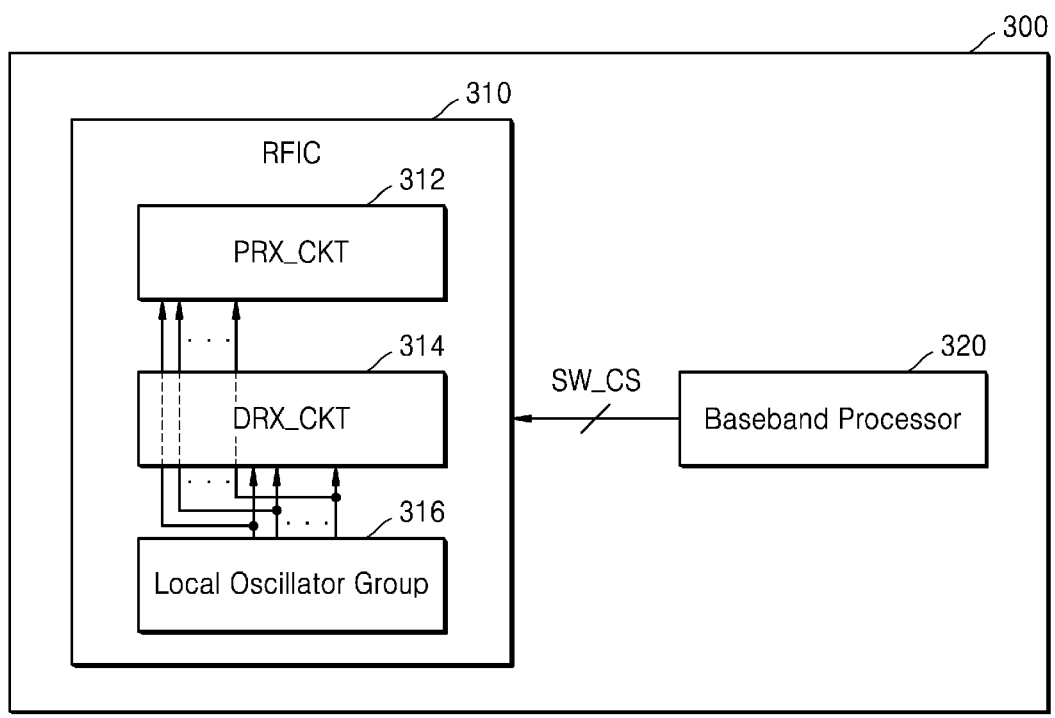
FIG. 10 is a block diagram of an example of a wireless communication apparatus according to an embodiment.

FIG. 10 is a block diagram of a wireless communication apparatus 300 according to an embodiment.

Referring to FIG. 10, the wireless communication apparatus 300 may include an RFIC 310 and a baseband processor 320. The RFIC 310 may include a first reception circuit 312, a second reception circuit 314, and a local oscillator group 316. The first reception circuit 312 may receive carrier signals from a plurality of primary antennas, and the second reception circuit 314 may receive carrier signals from a plurality of diversity antennas. The first reception circuit 312 and the second reception circuit 314 may receive oscillation signals having various frequencies from the local oscillator group 316 and frequency down-convert the carrier signals. All the embodiments described with reference to FIGS. 1 to 9 may be applied to the RFIC 310.

The baseband processor 320 may generate a switching control signal SW_CS based on control information acquired from a base station and provide the switching control signal SW_CS to the RFIC 310. Switch circuits included in the RFIC 310 may perform a routing operation for carrier signals by considering the usage of load circuits and frequency bands or frequency channels of the carrier signals, in response to the switching control signal SW_CS.

Figure 11:
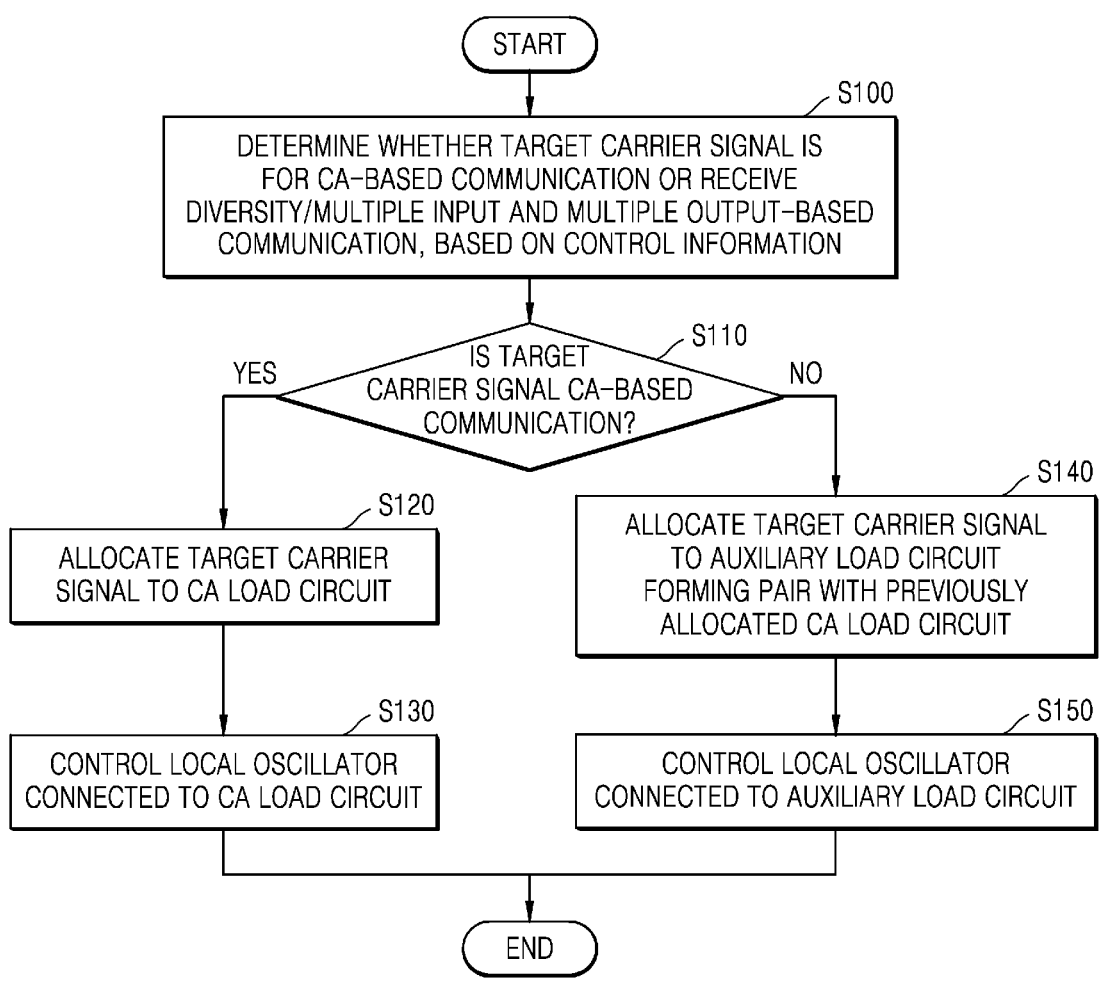
FIG. 11 is a flowchart of an example of an operating method of a baseband processor, according to an embodiment.

FIG. 11 is a flowchart of an operating method of a baseband processor, according to an embodiment.

Referring to FIG. 11, in operation S100, the baseband processor may determine whether a target carrier signal needed to be routed to a certain load circuit is for CA-based communication or receive diversity/multiple input and multiple output-based communication, based on control information. When the target carrier signal is for CA-based communication in operation S110 (Yes), the baseband processor may allocate the target carrier signal to a CA load circuit in subsequent operation S120. In operation S130, the baseband processor may control a local oscillator connected to the CA load circuit to provide an oscillation signal suitable for the target carrier signal to the CA load circuit.

Otherwise, when the target carrier signal is not for CA-based communication in operation S110 (No), the baseband processor may allocate the target carrier signal to an auxiliary load circuit forming a pair with the CA load circuit in subsequent operation S140. In operation S150, the baseband processor may control a local oscillator, to which the CA load circuit forming a pair with the auxiliary load circuit and the auxiliary load circuit are commonly connected, to provide an oscillation signal suitable for the target carrier signal to the auxiliary load circuit.

Figure 12:
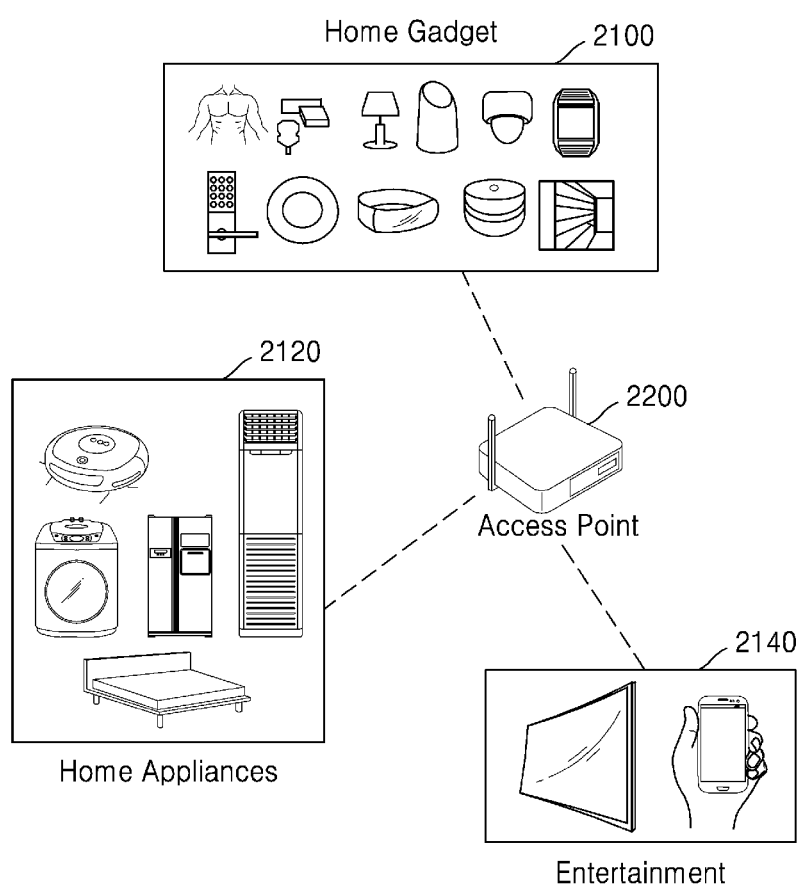
FIG. 12 illustrates examples of communication devices having a receiver according to an embodiment.

FIG. 12 illustrates communication devices having a receiver according to an embodiment.

Referring to FIG. 12, each of home gadgets 2100, home appliances 2120, entertainment devices 2140, and an AP 2200 may include a plurality of transceivers according to embodiments discussed above. According to some embodiments, the home gadgets 2100, the home appliances 2120, the entertainment devices 2140, and the AP 2200 may construct a network system. The communication devices shown in FIG. 12 are merely illustrative, and it will be understood that a wireless communication apparatus according to an embodiment may also be included in other communication devices not shown in FIG. 12.

Figure 13:
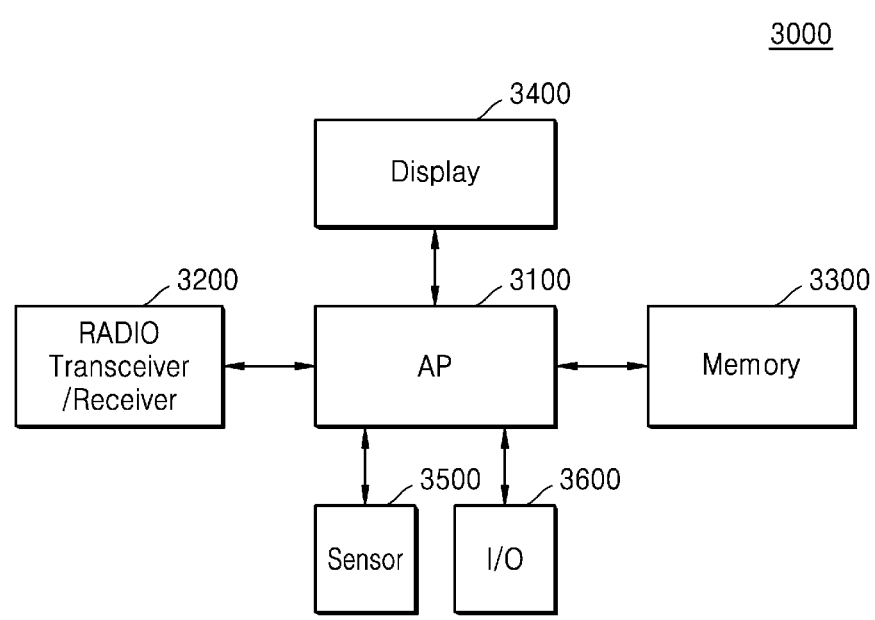
FIG. 13 is a block diagram of an example of an Internet of Things (IoT) device according to an embodiment.

FIG. 13 is a block diagram of an IoT device 3000 according to an embodiment.

Referring to FIG. 13, the IoT device 3000 may include an application processor (AP) 3100, receivers (or transceivers) 3200, a memory 3300, a display 3400, a sensor 3500, and an input and output (I/O) device 3600.

The IoT device 3000 may communicate with the outside through the receivers 3200. The receivers 3200 may include, for example, a wireless short-range communication interface such as a wireless local area network (LAN) interface, a Bluetooth interface, a wireless fidelity (Wi-Fi) interface, or a Zigbee interface, and a modem communication interface connectable to a power line communication (PLC) network or a mobile cellular network such as a 3rd Generation (3G) network, an LTE network, or a 5G network. The configuration of the embodiments may be applied to the receivers 3200.

The AP 3100 may control a general operation of the IoT device 3000 and operations of the components in the IoT device 3000. The AP 3100 may perform various arithmetic operations. According to an embodiment, the AP 3100 may include a single process core (single-core AP) or a plurality of process cores (multi-core AP).

The sensor 3500 may include, for example, an image sensor configured to sense an image. The sensor 3500 may be connected to the AP 3100 to transmit generated image information to the AP 3100. The sensor 3500 may be a biosensor configured to sense biometric information. The sensor 3500 may be an arbitrary sensor such as an illuminance sensor, an acoustic sensor, an acceleration sensor, or the like.

The display 3400 may display internal state information of the IoT device 3000. The display 3400 may include a touch sensor. In addition, the display 3400 may include an input or output function and an exterior for a user interface. A user may control the IoT device 3000 through the touch sensor and the user interface.

The I/O device 3600 may include an input interface including a touch pad, a keypad, an input button, and the like and an output means including a display, a speaker, and the like. The memory 3300 may store control instruction code for controlling the IoT device 3000, control data, or user data. The memory 3300 may include at least one of a volatile memory and a nonvolatile memory.

The IoT device 3000 may have a battery embedded therein for internal power supply or further include a power supply unit configured to receive power from the outside. In addition, the IoT device 3000 may further include a storage device. The storage device may be a nonvolatile medium such as a hard disk drive (HDD), a solid-state disk (SSD), an embedded multimedia card (eMMC), or a universal flash storage (UFS). The storage device may store user's information provided through the I/O device 3600 and sensing information collected through the sensor 3500.

While the inventive concept has been particularly shown and described with reference to embodiments thereof, it will be understood that various changes in form and details may be made therein without departing from the spirit and scope of the following claims.

What is claimed is:

1. A receiver comprising:
   a plurality of primary antennas configured to receive a plurality of first carrier signals corresponding to at least a first frequency band of a plurality of frequency bands;
   a plurality of diversity antennas configured to receive a plurality of second carrier signals corresponding to at least a second frequency band of the plurality of frequency bands;
   a first local oscillator configured to generate a first oscillation signal;
   a first load circuit pair connected to the first local oscillator, and configured to frequency down-convert at least one first carrier signal of the plurality of first carrier signals, and having a first load circuit and a second load circuit adjacent to the first load circuit; and
   a second load circuit pair connected to the first local oscillator, configured to frequency down-convert at least one second carrier signal of the plurality of second carrier signals, and having a third load circuit and a fourth load circuit adjacent to the third load circuit.

2. The receiver of claim 1, wherein the first load circuit is allocated for a first usage and is configured to frequency down-convert using the first frequency band,
   wherein the second load circuit is allocated for a second usage different from the first usage and is configured to frequency down-convert using the first frequency band,
   wherein the third load circuit is allocated for the first usage and is configured to frequency down-convert using the second frequency band, and
   wherein the fourth load circuit is allocated for the second usage and is configured to frequency down-convert using the second frequency band.

3. The receiver of claim 1, wherein the first load circuit is allocated for carrier aggregation-based communication,
   wherein the second load circuit is allocated for receive diversity or multiple input and multiple output-based communication,
   wherein the third load circuit is allocated for the carrier aggregation-based communication, and
   wherein the fourth load circuit is allocated for the receive diversity or the multiple input and multiple output-based communication.

4. The receiver of claim 1, wherein a first signal line from the first local oscillator to the first load circuit has a first length,
   wherein a second signal line from the first local oscillator to the second load circuit has a second length,
   wherein a first difference between the first length and the second length is less than or equal to a threshold difference,
   wherein a third signal line from the first local oscillator to the third load circuit has a third length,
   wherein a fourth signal line from the first local oscillator to the fourth load circuit has a fourth length, and
   wherein a second difference between the third length and the fourth length is less than or equal to the threshold difference.

5. The receiver of claim 1, further comprising:
   a second local oscillator configured to generate a second oscillation signal; and
   a third load circuit pair connected to the second local oscillator, and configured to frequency down-convert at least one third carrier signal of the plurality of first carrier signals, and having a fifth load circuit and a sixth load circuit adjacent to the fifth load circuit,
   wherein the sixth load circuit is adjacent to the first load circuit pair and is further connected to the first local oscillator.

6. The receiver of claim 5, wherein the fifth load circuit is allocated to perform carrier aggregation-based communication, and
   wherein the sixth load circuit is allocated to perform receive diversity or multiple input and multiple output-based communication.

7. The receiver of claim 6, wherein the first load circuit is allocated to perform the carrier aggregation-based communication,
   wherein the second load circuit is allocated to perform the receive diversity or multiple input and multiple output-based communication, and
   wherein the fifth load circuit, the sixth load circuit, the first load circuit, and the second load circuit are sequentially arranged in in a first direction.

8. The receiver of claim 1, further comprising a second local oscillator configured to generate a second oscillation signal,
   wherein the second load circuit is further connected to the second local oscillator,
   wherein the first load circuit is allocated to perform carrier aggregation-based communication, and
   wherein the second load circuit is allocated to perform receive diversity or multiple input and multiple output-based communication or the carrier aggregation-based communication.

9. The receiver of claim 8, wherein the fourth load circuit is further connected to the second local oscillator,
   wherein the third load circuit is allocated to perform the carrier aggregation-based communication, and wherein the fourth load circuit is allocated to perform the receive diversity or the multiple input and multiple output-based communication or the carrier aggregation-based communication.

10. The receiver of claim 1, further comprising:
a first switch circuit a first plurality of switch elements configured to route at least a first carrier signal of the plurality of first carrier signals to the first load circuit or the second load circuit based on a first usage allocated to the first load circuit and a second usage allocated to the second load circuit; and
a second switch circuit including a second plurality of switch elements configured to route at least a second carrier signal of the plurality of second carrier signals to the third load circuit or the fourth load circuit based on a third usage allocated to the third load circuit and a fourth usage allocated to the fourth load circuit.

11. The receiver of claim 10, further comprising:
a first amplification circuit including a first plurality of low noise amplifiers configured to low-noise amplify the plurality of first carrier signals; and
a second amplification circuit including a second plurality of low noise amplifiers configured to low-noise amplify the plurality of second carrier signals.

12. The receiver of claim 1, further comprising a second local oscillator configured to generate a second oscillation signal,
wherein the second load circuit and the fourth load circuit are further connected to the second local oscillator,
wherein the first load circuit is allocated for a first usage and is configured to frequency down-convert using the first frequency band,
wherein based on the second load circuit being allocated for the first usage, the second load circuit is configured to frequency down-convert using the second frequency band,
wherein based on the second load circuit being allocated for a second usage different from the first usage, the second load circuit is configured to frequency down-convert using the first frequency band,
wherein the third load circuit is allocated for the first usage and is configured to frequency down-convert using the second frequency band
wherein based on the fourth load circuit being allocated for the first usage, the fourth load circuit is configured to frequency down-convert using the first frequency band, and
wherein based on the fourth load circuit being allocated for the second usage, the fourth load circuit is configured to frequency down-convert using the second frequency band.

13. A wireless communication apparatus comprising:
a plurality of primary antennas configured to receive a plurality of first carrier signals corresponding to at least a first frequency band of a plurality of frequency bands;
a plurality of diversity antennas configured to receive a plurality of second carrier signals corresponding to at least a second frequency band of the plurality of frequency bands;
a first reception circuit connected to the plurality of primary antennas and configured to generate a plurality of first baseband signals from the plurality of first carrier signals; and
a second reception circuit connected to the plurality of diversity antennas and configured to generate a plurality of second baseband signals from the plurality of second carrier signals,
wherein each reception circuit of the first reception circuit and the second reception circuit comprises a plurality of load circuit pairs, and
wherein each load circuit of the plurality of load circuit pairs comprises a carrier aggregation load circuit connected to a first local oscillator, and an auxiliary load circuit adjacent to the carrier aggregation load circuit and connected to the first local oscillator.

14. The wireless communication apparatus of claim 13, wherein a first signal line from the first local oscillator to the carrier aggregation load circuit has a first length,
wherein a second signal line from the first local oscillator to the auxiliary load circuit has a second length, and
wherein a difference between the first length and the second length is less than or equal to a threshold difference.

15. The wireless communication apparatus of claim 13, wherein the first reception circuit further comprises a first switch circuit having a first plurality of switch elements configured to route the plurality of first carrier signals to the plurality of load circuit pairs included in the first reception circuit, and
wherein the second reception circuit further comprises a second switch circuit having a second plurality of switch elements configured to route the plurality of second carrier signals to the plurality of load circuit pairs included in the second reception circuit.

16. The wireless communication apparatus of claim 15, further comprising a baseband processor configured to:
generate a switching control signal based on control information received from a base station, and
provide the switching control signal to the first switch circuit and the second switch circuit.

17. The wireless communication apparatus of claim 16, wherein the baseband processor is further configured to:
allocate a target carrier signal from among the plurality of first carrier signals to the carrier aggregation load circuit included in a first load circuit pair based on the target carrier signal corresponding to carrier aggregation-based communication, and
allocate the target carrier signal to the auxiliary load circuit paired with the carrier aggregation load circuit sharing a frequency band to which the target carrier signal is allocated based on the target carrier signal corresponding to receive diversity or multiple input and multiple output-based communication.

18. The wireless communication apparatus of claim 13, wherein the auxiliary load circuit is further connected to a second local oscillator connected to an adjacent load circuit pair adjacent to the auxiliary load circuit.

19. A wireless communication apparatus comprising:
a first reception circuit having a plurality of first load circuit pairs configured to receive a plurality of first carrier signals corresponding to at least a first frequency band of a plurality of frequency bands through a plurality of primary antennas, and configured to perform frequency down-conversion using the first frequency band;
a second reception circuit having a plurality of second load circuit pairs configured to receive a plurality of second carrier signals corresponding to at least a second frequency band of the plurality of frequency bands through a plurality of diversity antennas, and configured to perform the frequency down-conversion using the second frequency band; and
a baseband processor configured to control routing of the plurality of first carrier signals to the plurality of first load circuit pairs, and routing of the plurality of second carrier signals to the plurality of second load circuit pairs, based on a pre-set usage of a load circuit, wherein each load circuit pair of the plurality of first load circuit pairs and the plurality of second load circuit pairs comprises a carrier aggregation load circuit connected to a first local oscillator, and an auxiliary load circuit adjacent to the carrier aggregation load circuit and connected to the first local oscillator.

20. The wireless communication apparatus of claim 19, wherein the auxiliary load circuit is configured to be further connected to a second local oscillator that is connected to a first load circuit pair or a second load circuit pair adjacent to the auxiliary load circuit, or to be further connected to a third local oscillator that is not connected to the first load circuit pair or the second load circuit pair.

* * * * *